(12) United States Patent
Tsai

(10) Patent No.: US 6,866,290 B2
(45) Date of Patent: Mar. 15, 2005

(54) APPARATUS OF A COLLAPSIBLE HANDCART FOR TURNING A PLATFORM WHEN OPERATING A RETRACTABLE HANDLE

(76) Inventor: James Tsai, No. 103, Ta-Ming 1 Rd., Tung Pao Village, Tan Tzu Hsian, Taichung Hsien (TW)

( * ) Notice: Subject to any disclaimer, the term of this patent is extended or adjusted under 35 U.S.C. 154(b) by 62 days.

(21) Appl. No.: 10/309,060

(22) Filed: Dec. 4, 2002

(65) Prior Publication Data

US 2004/0108669 A1 Jun. 10, 2004

(51) Int. Cl.$^7$ ................................................. B62D 1/04
(52) U.S. Cl. ..................................... 280/655; 280/47.29
(58) Field of Search ................................ 280/651, 652, 280/654, 655, 47.24, 47.29, 40

(56) References Cited

U.S. PATENT DOCUMENTS

| | | | | |
|---|---|---|---|---|
| 1,193,729 A | * | 8/1916 | Stebler | 414/450 |
| 2,062,498 A | * | 12/1936 | Byington | 414/451 |
| 3,647,238 A | * | 3/1972 | Mackey | 280/47.29 |
| 3,907,322 A | * | 9/1975 | Kiryu | 280/654 |
| 4,128,252 A | * | 12/1978 | Raniero | 280/40 |
| 4,754,985 A | * | 7/1988 | Im et al. | 280/40 |
| 4,917,392 A | * | 4/1990 | Ambasz | 280/40 |
| 4,974,862 A | * | 12/1990 | Maupin | 280/47.27 |
| 4,993,727 A | * | 2/1991 | vom Braucke et al. | 280/40 |
| 5,348,325 A | * | 9/1994 | Abrams | 280/40 |
| 5,626,352 A | * | 5/1997 | Grace | 280/47.29 |
| 5,803,471 A | * | 9/1998 | DeMars et al. | 280/40 |
| 6,234,497 B1 | * | 5/2001 | Stahler, Sr. | 280/47.29 |

FOREIGN PATENT DOCUMENTS

| | | | | |
|---|---|---|---|---|
| CA | 921065 | * | 2/1973 | 280/47.29 |
| GB | 667386 | * | 2/1952 | 280/47.29 |

* cited by examiner

Primary Examiner—Frank Vanaman
(74) Attorney, Agent, or Firm—Bacon & Thomas

(57) ABSTRACT

A collapsible handcart. The handcart includes two wheel seats, a retractable handle, two wheels and a platform. The wheels are pivoted on the wheel seats respectively for free rotation and the retractable handle is mounted to the wheel seats. The platform is pivoted on the wheel seats for movement between an extended position, at which the platform is turned downwards, and at a collapsed position, the platform is turned upwards. The platform can be driven to turn to the collapsed position when the retractable handle is retracted and the platform also can be driven to turn to the extended position when the retractable handle is extended.

14 Claims, 10 Drawing Sheets

US 6,866,290 B2

APPARATUS OF A COLLAPSIBLE HANDCART FOR TURNING A PLATFORM WHEN OPERATING A RETRACTABLE HANDLE

FIELD OF THE INVENTION

The present invention relates to a handcart, and more particularly to an apparatus of a collapsible handcart for turning a platform when operating a retractable handle.

BACKGROUND OF THE INVENTION

U.S. Pat. No. 4,917,392 taught a collapsible handcart, which provided an S-shaped cam slot at each of wheel seats, so that user can turn a platform to drive wheels to turn. Such that, the conventional handcart can be turn to an extended position, at which the platform was turned downwards and the wheels were driven to turn parallel to each other, and a collapsed position, at which the platform was turned upwards and the wheels were turned 90 degrees. When the handcart was turned to the extended position, the handcart can carry goods on the platform and can be driven to run, and when the handcart was turned to the collapsed position, the handcart will have a smaller size to be stored or carried.

In fact, there will be two steps for a user to change the conventional handcart from the collapsed position to an operating mode. First, user had to turn the platform downwards, and then he/she had to extend a retractable handle to pull the handcart to run. If user wanted to collapse the handcart, there still were two steps. In addition, user usually had to bend his/her trunk to reach the platform for turning it.

SUMMARY OF THE INVENTION

The primary objective of the present invention is to provide a collapsible handcart, which has a new operating mode to extend and to collapse the handcart.

According to the objective of the present invention, a collapsible handcart comprises two wheel seats, a retractable handle, two wheels and a platform. The wheels are pivoted on the wheel seats respectively for free rotation and the retractable handle is mount to the wheel seats. The platform is pivoted on the wheel seats for movement between an extended position, at which the platform is turned downwards, and a collapsed position, at which the platform is turned upwards. The platform can be driven to turn to the collapsed position when the retractable handle is retracted and the platform also can be driven to turn to the extended position when the retractable handle is extended.

DETAIL DESCRIPTION OF THE INVENTION

Figure 1:
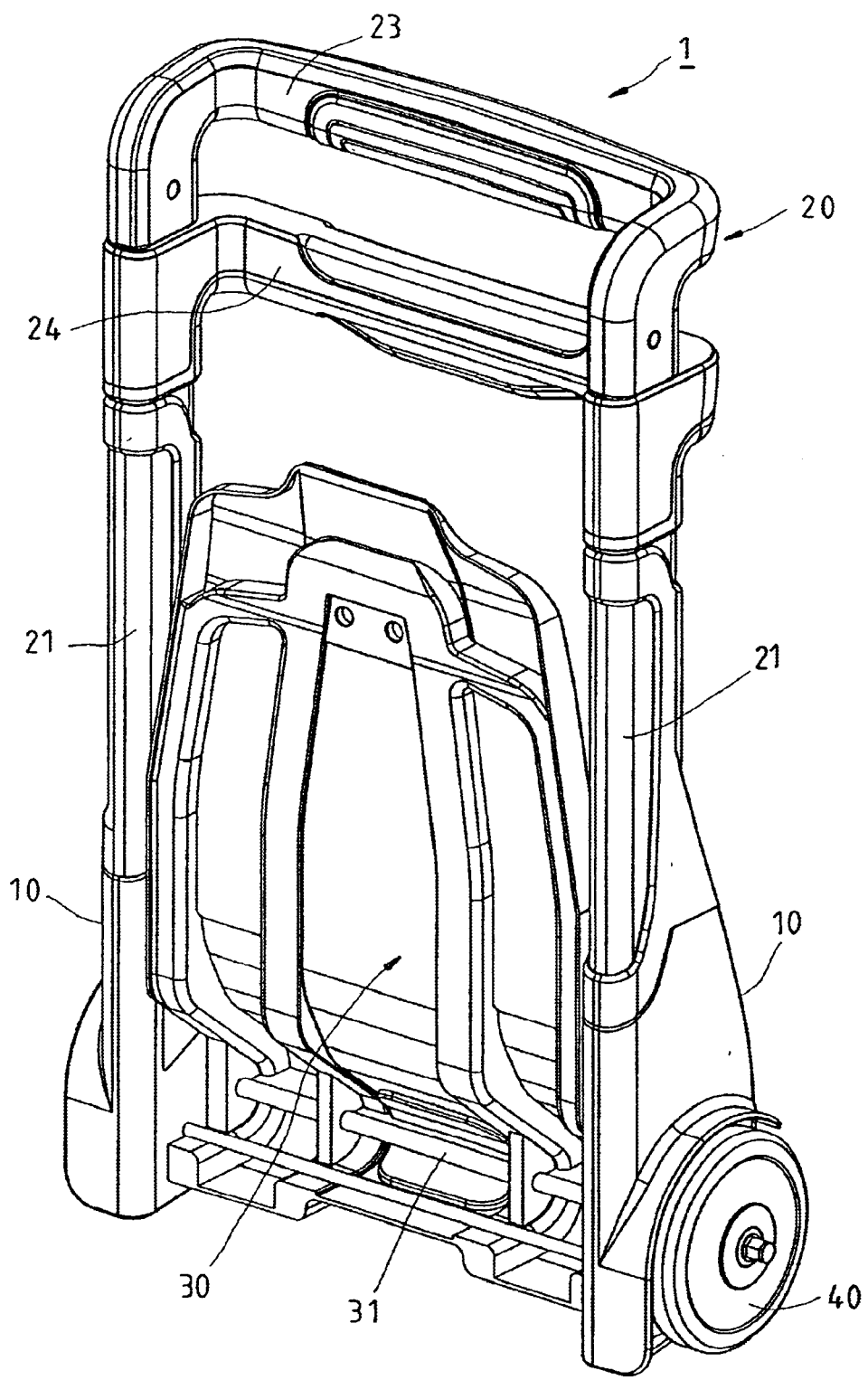
FIG. 1 is a perspective view of a first preferred embodiment of the present invention, showing the collapsible handcart being collapsed.
Figure 2:
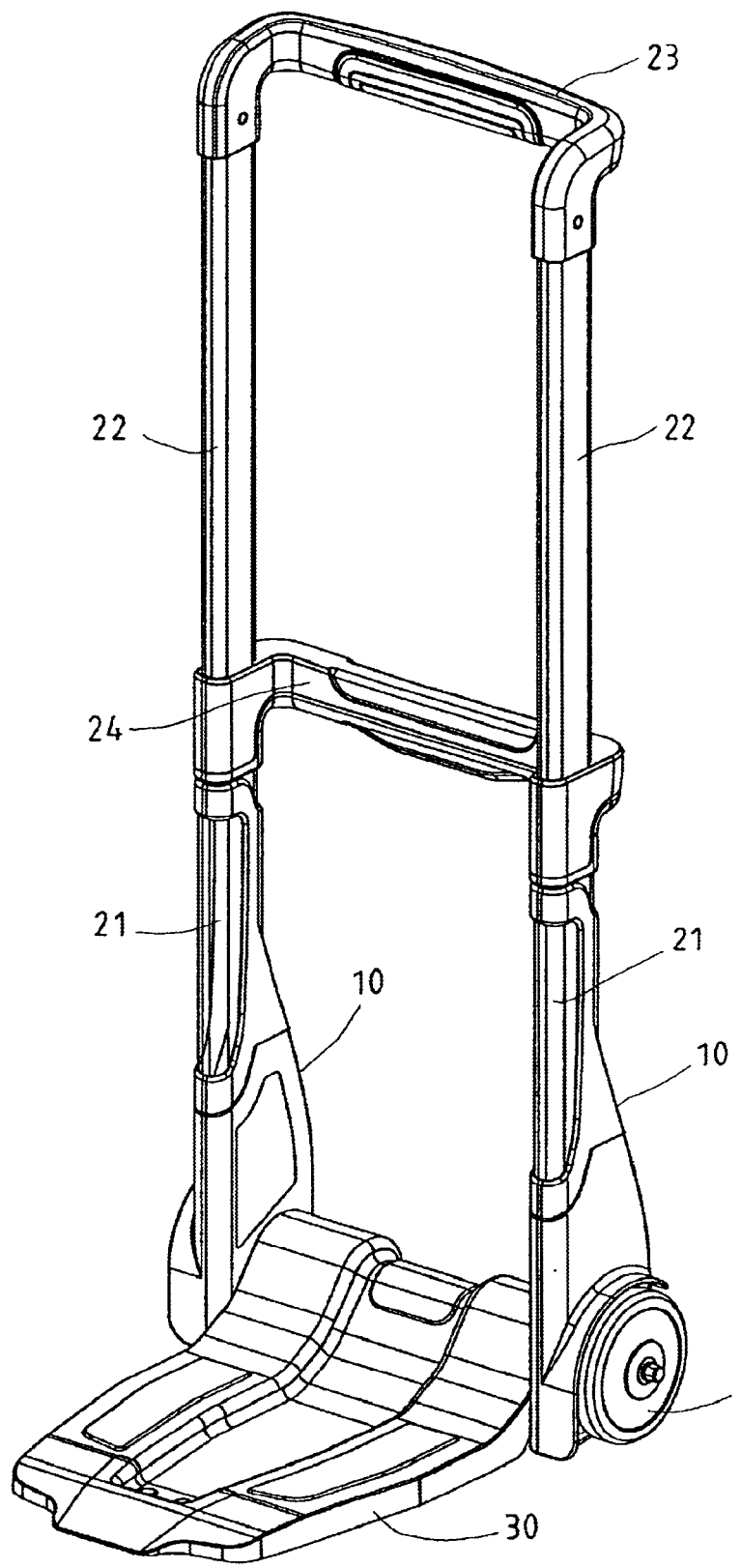
FIG. 2 is a perspective view of the first preferred embodiment of the present invention, showing the collapsible handcart being extended.
Figure 3:
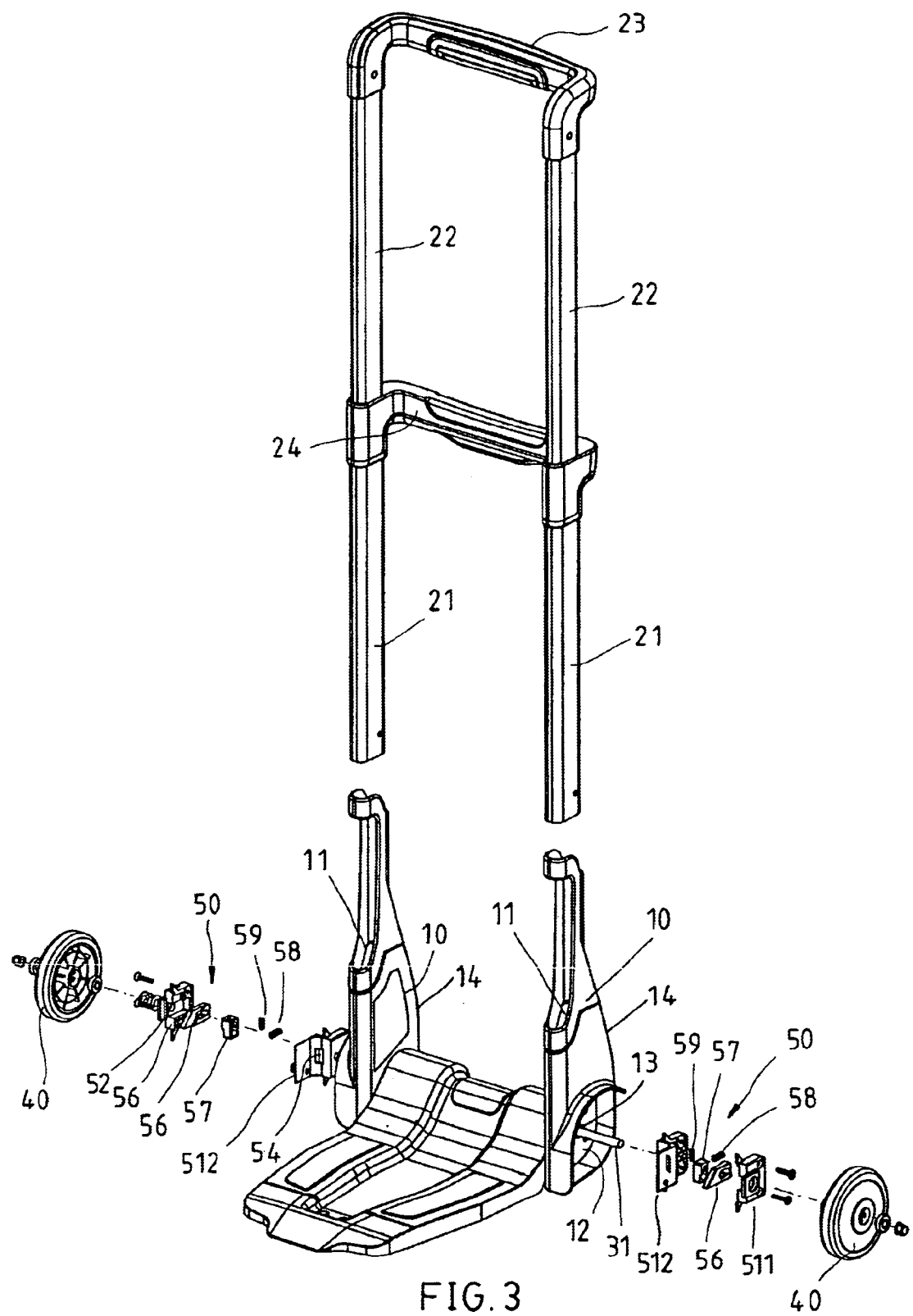
FIG. 3 is an exploded view of the first preferred embodiment of the present invention.

Please refer to FIGS. 1–3, wherein a collapsible handcart 1 of the first preferred embodiment of the present invention mainly comprises two wheel seats 10, a retractable handle 20, a platform 30 and two wheels 40.

Each of the wheel seats 10 has a slot 11 at a topside thereof to receive the retractable handle 20 and a chamber 12 at an exterior side thereof in communication with the slot 11. Each of the wheel seats 10 has a hole (not shown) at the bottom side of the chamber 12 running through the wheel seat 10. The wheel seat 10 further has a bearing surface (not shown) at rear side thereof.

The retractable handle 20 has two sets of retractable tubes, a handle bar 23 and a control bar 24. Each set of the retractable tubes includes a first tube 21 and a second tube 22 slidably engaged with each other. The handle bar 23 coupled with the second tubes 22 at the distal ends thereof and the control bar is coupled with the first tubes 21. The first tubes 21 receive their bottom ends in the slots 11 of the wheel seats 10 respectively and are fixed therein. The first tubes 21 are provided with openings 211 communicated with the chambers 12 of the wheel seats 10 respectively. The control bar 24 has a mechanism (not shown) therein to operate control devices (not shown) installed in the second tubes 22 such that the retractable tubes 21 and 22 can be retracted as shown in FIG. 1 and can be extended as shown in FIG. 2. The retractable handle 20 is a conventional element and reader can find the detail structure in many relative inventions, so I will not describe the detail here.

The platform 30 is fixed with a shaft 31 at its rear side thereof. The opposite ends of the shaft 31 run through the holes of the wheel seats 10 respectively to pivot the platform 30 on the wheel seats 10. Such that the platform 30 can be turned between a collapsed position as shown in FIG. 1 and an extended position as shown in FIG. 2.

The opposite ends of the shaft 31 are located in the chambers 12 of the wheel seats 10 on which pivot the wheels 40 for free rotation. The shaft 31 has two flat surfaces 32 at each of the opposite sides thereof which are located in the chambers 12 of the wheel seats 10 respectively.

Two sets of transferring means 50 are installed in the chambers 12 of the wheel seats 10 respectively. The transferring means 50 are to drive the platform 30 to turn to the collapsed position when the retractable tubes 11 and 12 are retracted and to drive the platform 30 to turn to the extended position when the retractable tubes 11 and 12 are extended.

The transferring means 50 has a housing 51, a trigger device 56, a driven device 57, a first spring 58 and a second spring 59.

The housing 51 is a combination of a first piece 511 and a second piece 512, wherein the first piece 511 has a transverse guiding rail 52 at its interior side and the second piece 512 has an extended board 53 at a side thereof. The second piece 512 attaches its exterior side onto the bottom of the chamber 12 for the board 53 attached on the first tube 11. The second piece 512 is provided with an opening 54 corresponding to the opening 211 of the first tube 11. The first piece 511 is attached on to the second piece 512 by means of two screws 55 running through the first piece 511 and the second piece 512 and screwing into the wheel seat 10 to secure the housing 51 in the chamber 12. The first piece 511 and the second piece 512 are provided with shaft openings 513 for the shaft 31 running through the housing 51. The first piece 511 and second piece 512 are each provided with two bearing arms 514 and 515 that rest against the first tube 11. The housing 51 has an extended board 516 at a side thereof attached on the first tube 21, as illustrated in FIGS. 3 and 4.

Figure 4:
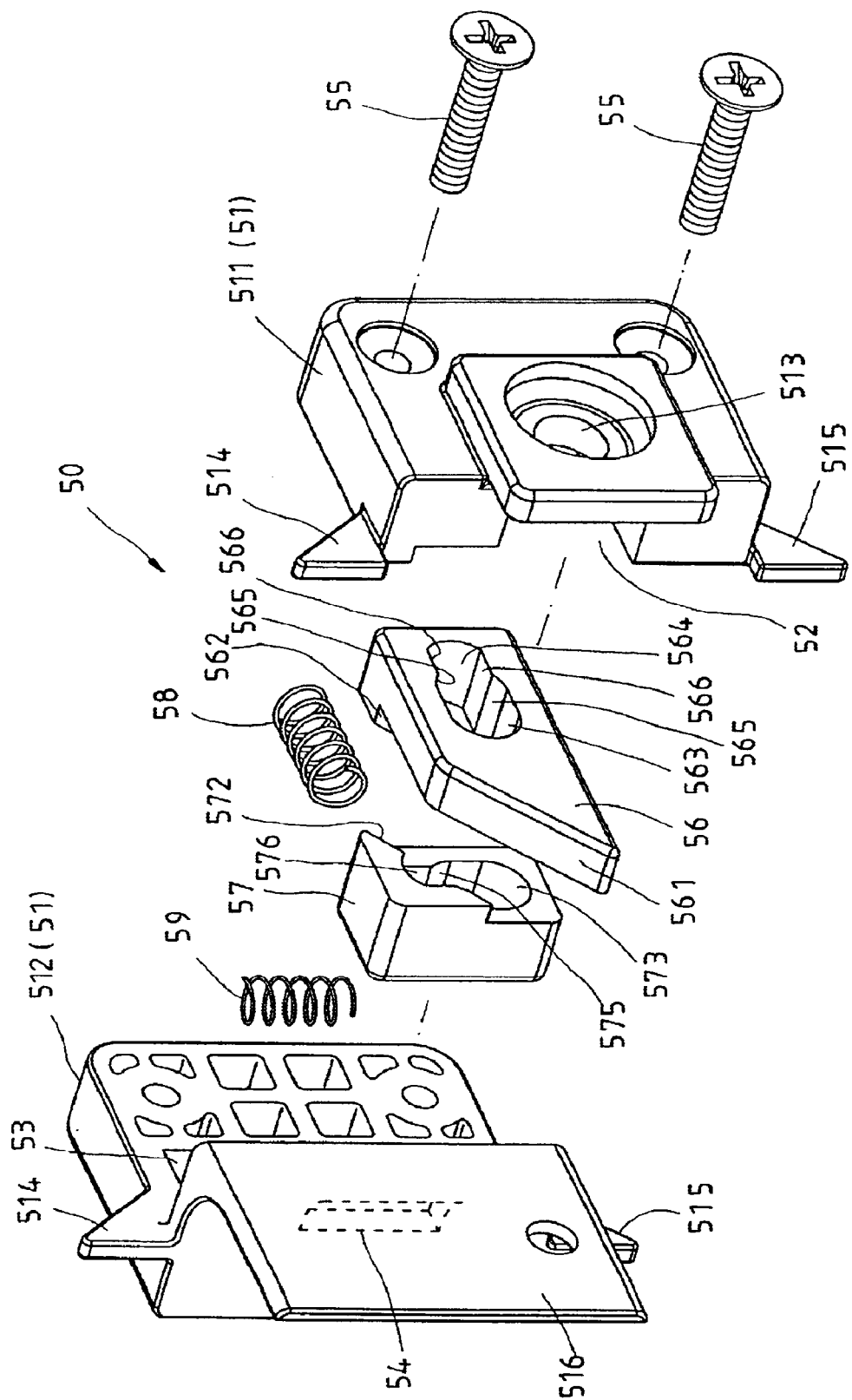
FIG. 4 is a front view of a trigger device of the first preferred embodiment of the present invention.
Figure 5:
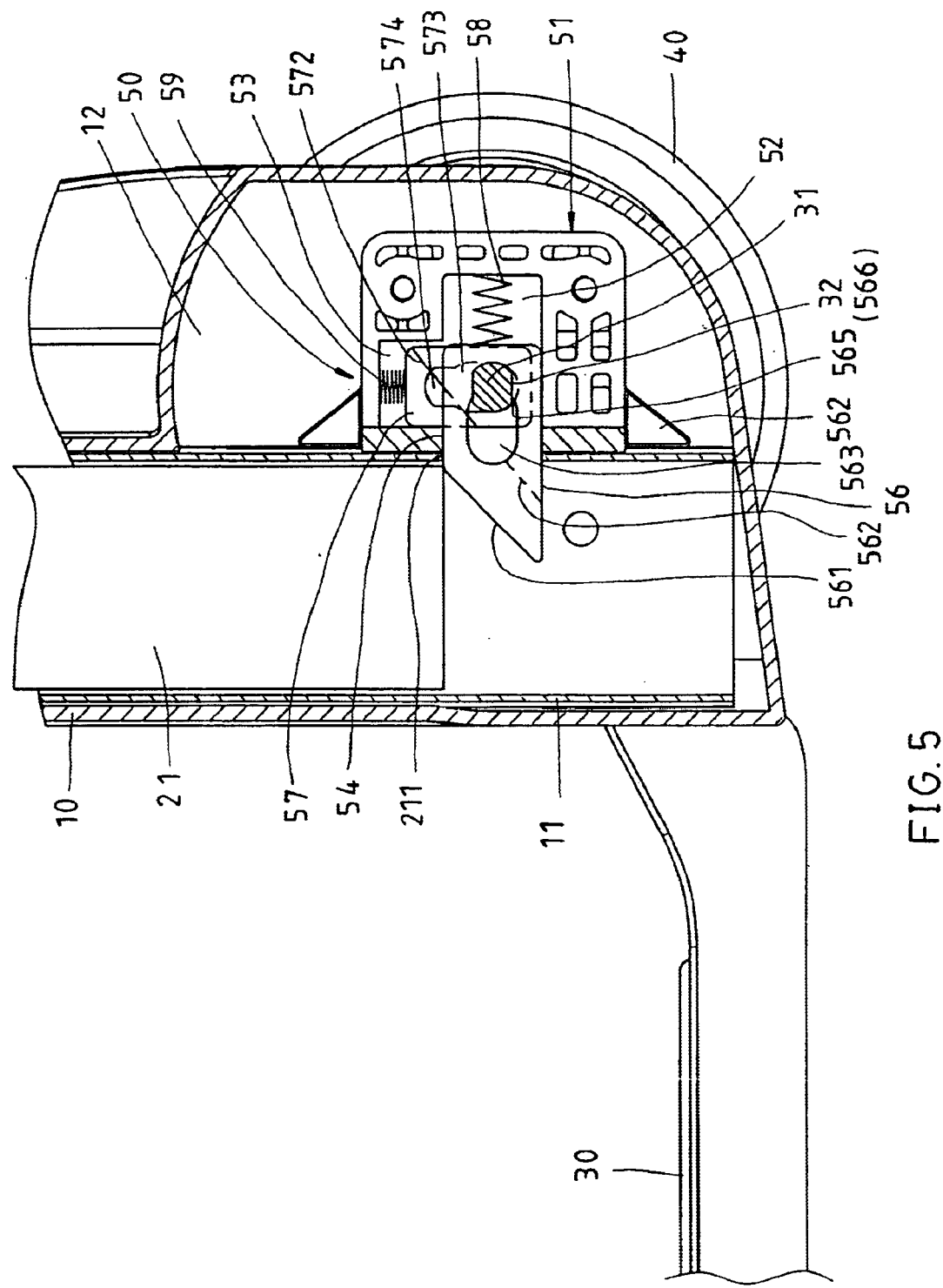
FIG. 5 is a back view of a driven device of the first preferred embodiment of the present invention.

Please refer to FIG. 4, The trigger device 56 has an inclined surface 561 at an end thereof, a driving surface 562 at interior side thereof, a first hole 563 and a second hole 564. The first and the second hole 563 and 564 are arranged in horizontal direction and the first hole 563 closes to the inclined surface 561. The first and the second hole 563 and 564 are communicated with each other and two converting portions 565 are provided in connected with the first and the second hole 563 and 564. The trigger device 56 further has two flat surfaces 566 at the opposite side walls of the second hole 564.

The trigger device 56 is movably engaged with the guiding rail 52 in the housing 51 with the inclined surface 561 extended into the first tube 11 via the openings 54 and 211 of the housing 51 and the first tube 11. The first spring 58 exerts the rear end of the trigger device 56 to provide an initial position wherein the inclined surface 561 is received in the first tube 11. The trigger device 56 can be driven for displacement between a first position (FIG. 6) and a second position (FIG. 7).

Please refer to FIG. 4. The driven device 57 also has a driving surface 572, a first hole 573, a second hole 574, two converting portions 575 and two flat surfaces 576 similar to the trigger device 56 has. The first hole 573 and the second hole 574 are arranged in vertical direction and the second hole 574 located at upper. The second spring 59 exerts the top end of the driven device 57.

Figure 6:
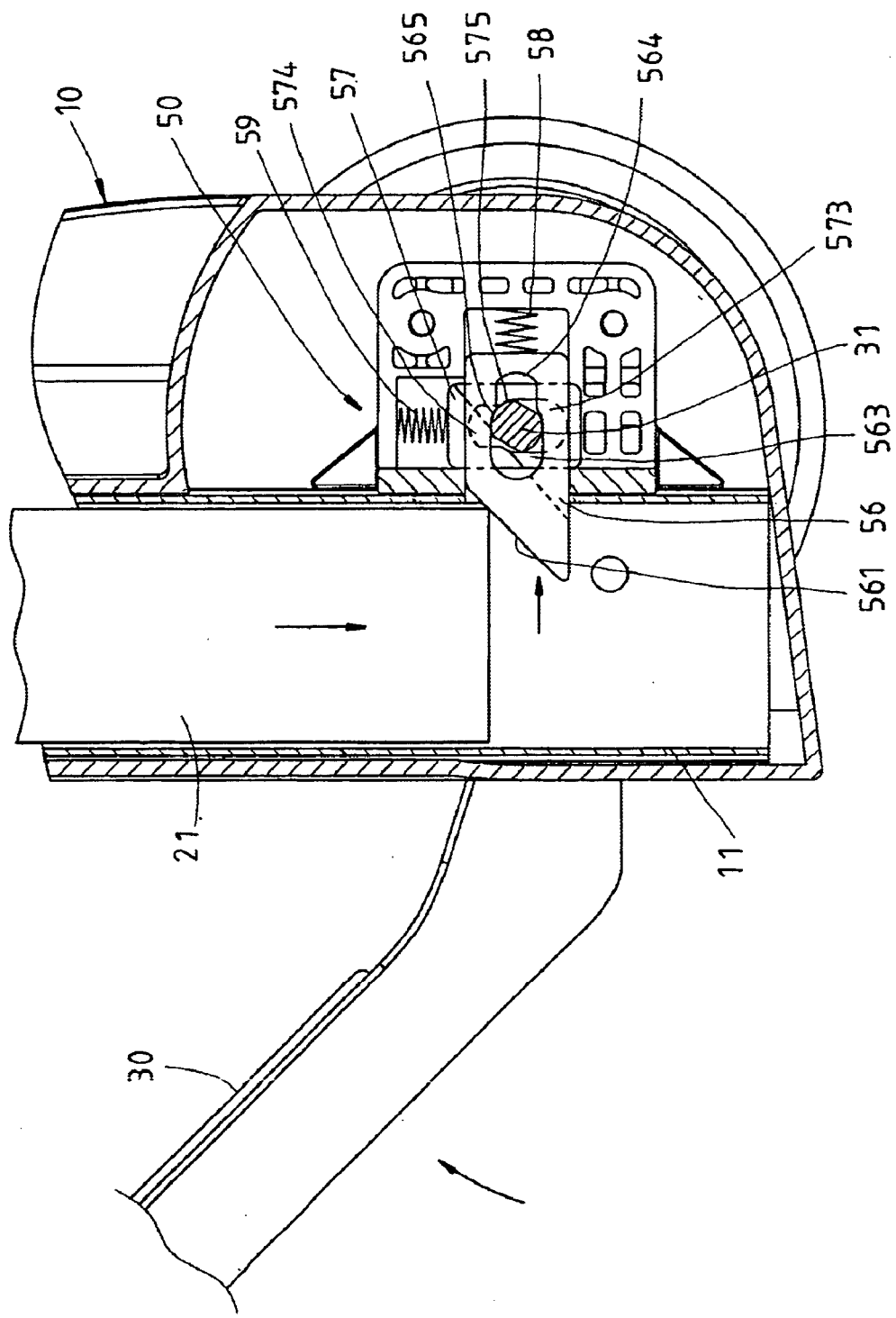
FIG. 6 is a sectional view of the first preferred embodiment of the present invention, showing the relationship of the trigger device, the driven device, the retractable tubes and the platform when the platform is turned to an extended position.
Figure 7:
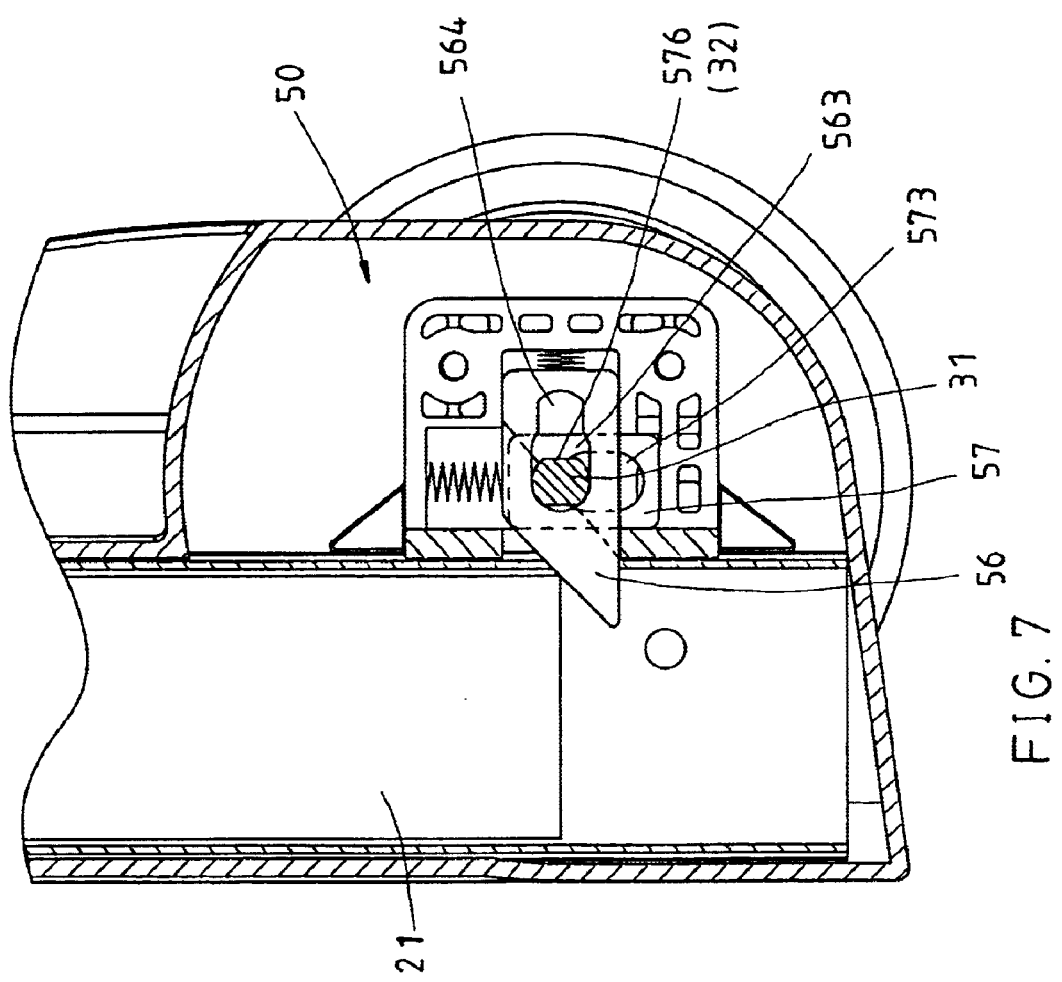
FIG. 7 is a sectional view following FIG. 6, showing the retractable tubes being retracted to drive the platform turned upwards about 45 degrees.

The driven device 57 is received in the housing 51 with the driving surface 572 thereof engaged with the driving surface 562 of the trigger device 56 such that the movement of the trigger device 56 will drive the driven device 57 for displacement between a first position (FIG. 6) and a second position (FIG. 7). The moving direction of the driven device 57 is substantially perpendicular to the moving direction of the trigger device 56.

I only describe the detail of one set of the transferring means 50, the other one has same elements installed on another wheel seat 10 as described above. So, I will not describe them again.

Please refer to FIG. 6, wherein the retractable tubes 21 and 22 are extended and the trigger device 56 and the driven device 57 are located at the first positions. The shaft 31 runs through the first hole 573 of the driven device 57 and the second hole 564 of the trigger device 56. At this time, the platform 30 is located at the extended position. The flat surfaces 32 of the shaft 31 are engaged with the flat surfaces 566 of the trigger device 56 that will stop the platform 30 to turn, in other words, the platform 30 will be secured at the extended position.

Please refer to FIG. 6, when the retractable tubes 21 and 22 are retracted to force the trigger device 56 and the driven device 57 to approach their second positions. The converting portions 565 and 575 will be in touch with the flat surfaces 32 of the shaft 31 and force the shaft to turn such that the platform 30 will be driven to turn upwards as shown in FIG. 6.

As the second tube 22 move downwards continuously, please refer to FIG. 7, the trigger 56 and drive the driven device 57 will be driven to move to the second positions continuously and the shaft 31 will be driven to turn continuously. When the trigger 56 and drive the driven device 57 arrived the second positions, the shaft now is turned about 90 degrees. The shaft 31, at this time, will enter the first hole 563 of the trigger device 56 and the second hole 574 of the driven device 57. The platform 30 now will be turned to the collapsed position and the flat surfaces 576 of the driven device 57 will be engaged with the flat surfaces 32 of the shaft 31 to secure the platform 30 at the collapsed position.

If the user pulls the handle bar 23 to make the second tubes 22 no longer against the trigger device 56, the first spring 58 will force the trigger device 56 and the driven device 57 moving back from the second positions to the first positions. The transferring means 50 will act reversibly such that the platform 30 will be turned to the extended position from the collapsed position. It has to be mentioned that the weight of the platform 30 will help the transferring means 50 to drive the platform 30 to turn downwards.

With the combination as described above, user only needs to operating the retractable handle 20 to retract and extend, it will drive the platform 30 to turn. In other words, user only needs to pull the retractable handle 20 to make it extended, the platform 30 will be driven to turn from the collapsed position to the extended position. Only one step is needed to operate, user can extend the collapsed handcart 1 of the present invention to carry goods on it and drive it to run. User also only need to push the retractable handle 20 to make it retracted, the platform 30 will be driven to turn from the extended position to the collapsed position to collapse the handcart 1 of the present invention.

Figure 8:
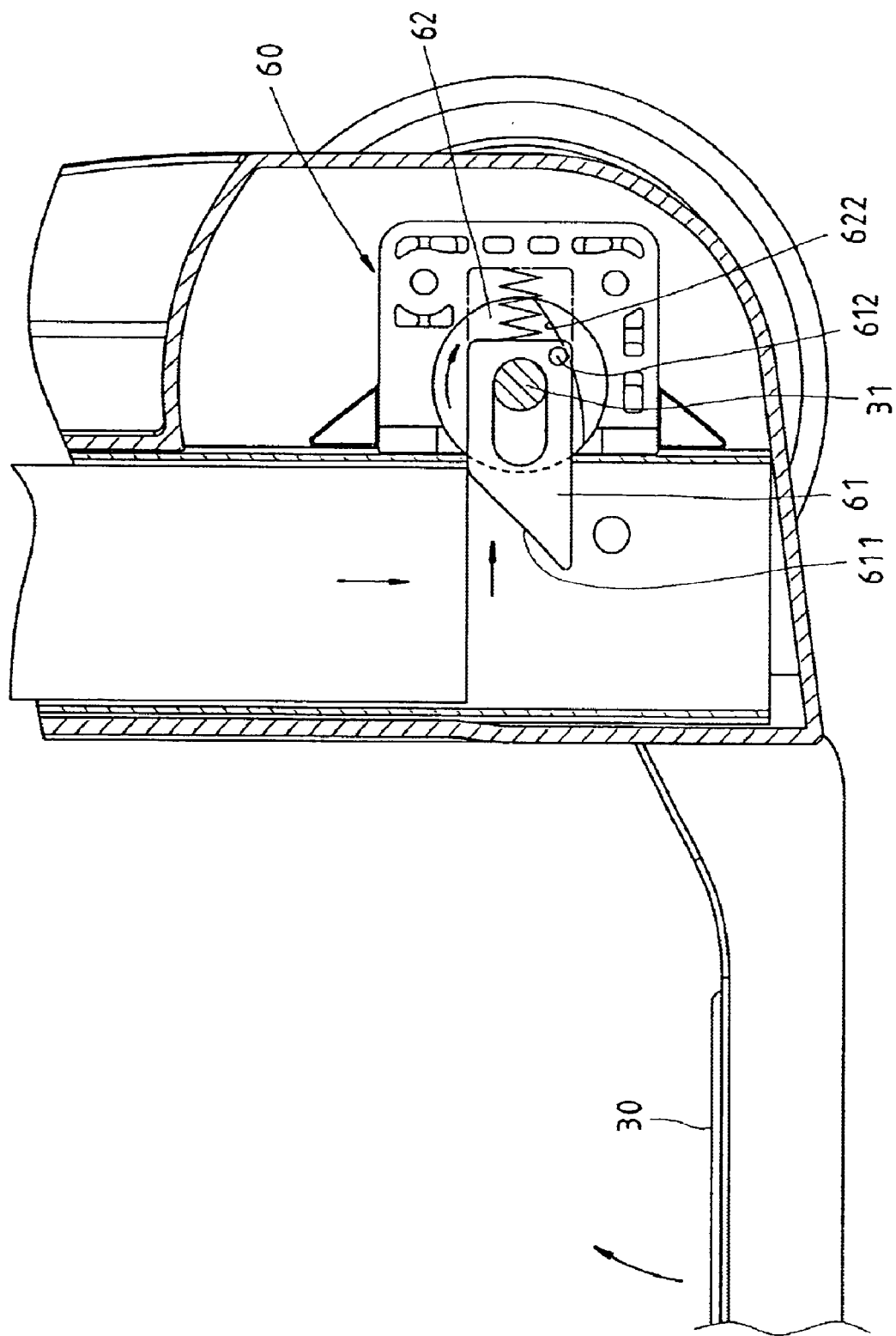
FIG. 8 is a sectional view of a second preferred embodiment of the invention, showing a second type of trigger device and driving device.

FIG. 8 shows a second type of transferring means 60 including a trigger device 61 and a driven device 62. The trigger device 61 is similar to the corresponding element on the first preferred embodiment having an inclined surface 611 at an end thereof a pin 612 at interior side thereof and an elongated slot 613. The driven device 62 is fixed with the shaft 31 of the platform 30 can rotate with the shaft 31. The driving device 62 is provided with a driving surface 622 at a side thereof and is engaged with the pin 612 of the trigger device 61. Such that the movement of the trigger device 61 will drive the driven device 622 to rotate, in the meantime, the platform will be driven to turn.

Figure 9:
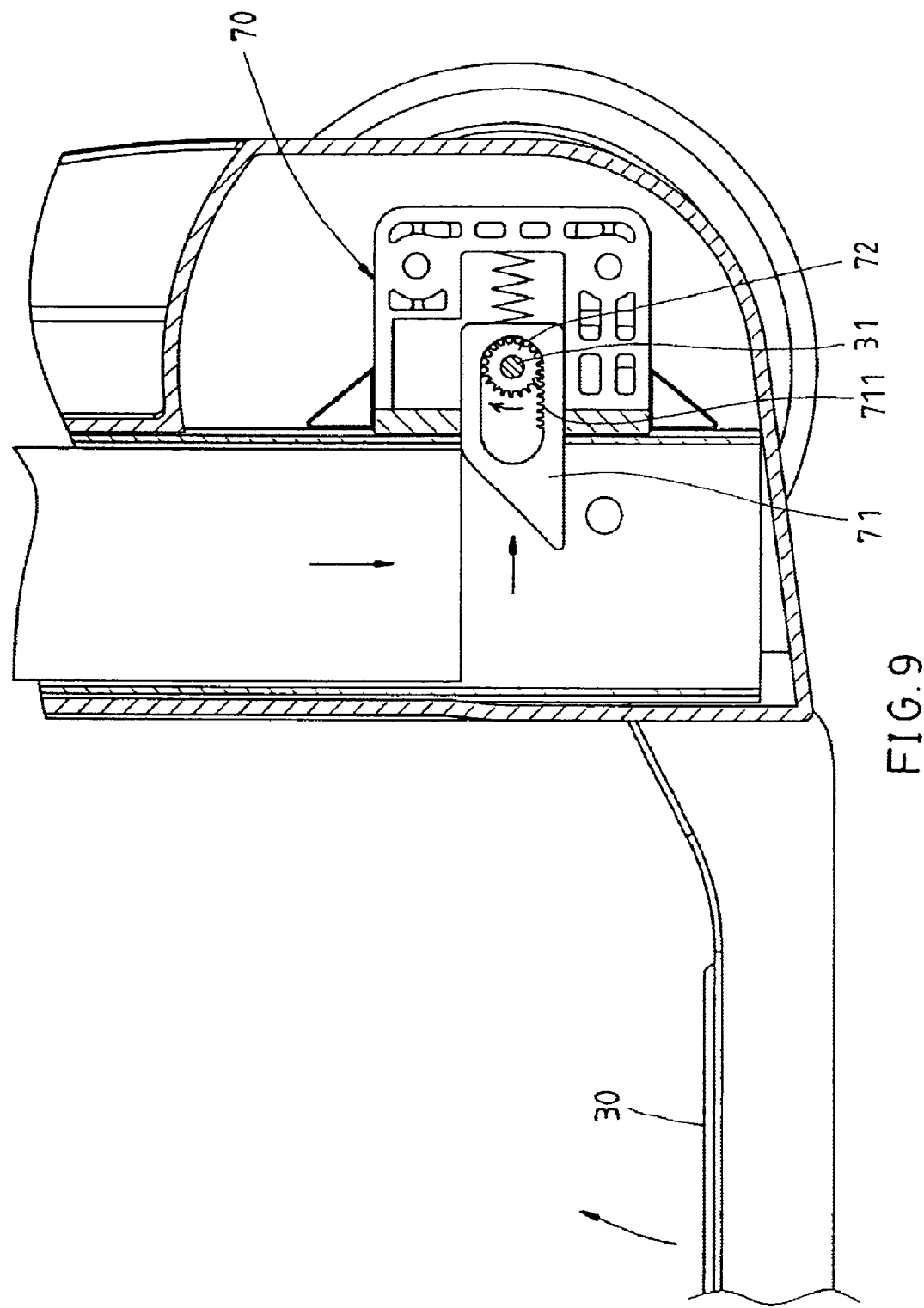
FIG. 9 is a sectional view of a second third preferred embodiment of the present invention, showing a thrid type of the trigger device and the drive device.

FIG. 9 shows a third type of transferring means 70 including a trigger device 71 and a gear 72. The trigger device 71 is similar to above element having a rack 711. The gear 72 is fixed with the shaft 31 and engaged with the rack 711 of the trigger device. Such that the trigger device 71 can drive the platform 30 to turn.

Figure 10:
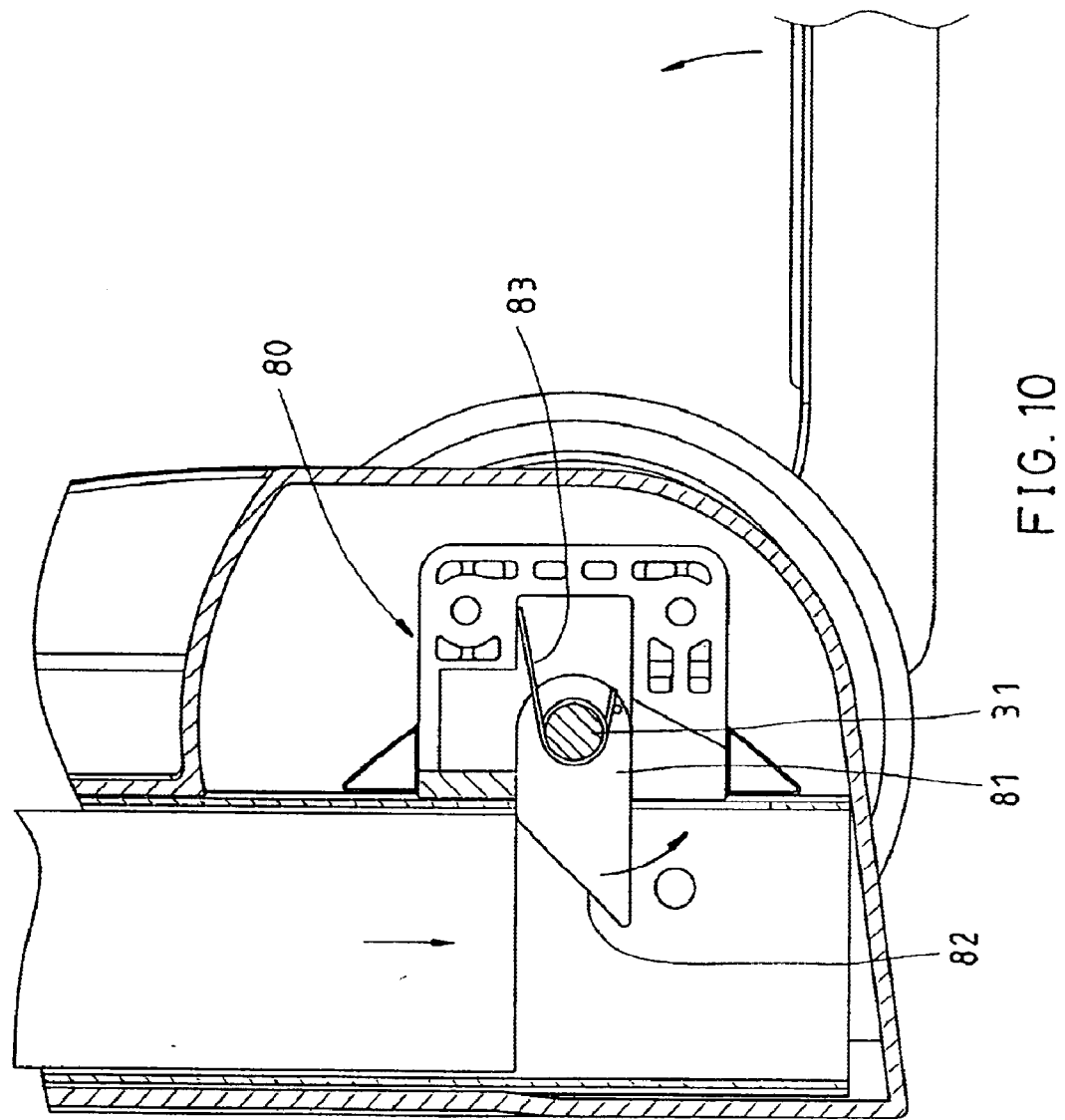
FIG. 10 is a sectional view of a fourth preferred embodiment of the present invention, showing a fourth type of the trigger device and the driven device.

FIG. 10 shows a fourth type of transferring means 80, which has a trigger device 81 having an inclined surface 82 at the end extending into the retractable tube. The trigger device 81 is fixed with the shaft 31 with spring 83, so that the retractable tube can drive the trigger device 81 to turn and the trigger device 81 will drive the shaft 31 (the platform) to turn.

What is claimed is:

1. A collapsible handcart, comprising:

two wheel seats;

a retractable handle having a first tube and a second tube slidably engaged with said first tube to be extended and retracted, wherein said first tube is mounted to said wheel seat and has an opening;

a platform provided with a shaft at its rear side, said shaft pivoted on said wheel seats such that said platform can be turned between an extended position, at which said platform is turned downwards, and a collapsed position, at which said platform is turned upwards;

two wheels pivoted on said wheel seats respectively;

a trigger device movably disposed at said wheel seat and having an end thereof extended into said first tube via said opening of said first tube;

whereby said trigger device will be driven by said second tube for movement when said second tube is retracted from said first tube;

biasing means exerted on said trigger device against said second tube; and means for driving said platform to turn to the collapsed position when said trigger device is driven by said second tube and drive said platform to turn to the extended position when said trigger device is not driven by said second tube.

2. The collapsible handcart as defined in claim 1, wherein said trigger device has an inclined surface at an end thereof received in said first tube.

3. The collapsible handcart as defined in claim 1, wherein said trigger device is driven by said second tube for displacement between a first position and a second position and said trigger device has a first hole and a second hole in communicating with each other and arranged along direction of movement of said trigger device and said trigger device further has at least a converting portion at a boundary of said first hole and said second hole whereby said shaft of said platform runs through said second hole of said trigger device when said trigger device is located at said first position and said shaft will be driven to turn a predetermined angle by said converting portion and enter said first hole when said trigger device is driven to shift to said second position.

4. The collapsible handcart as defined in claim 3, wherein said shaft has at least a flat surface and said trigger device has at least a flat surface at a side wall of said second hole adapted to be engaged with said flat surface of said shaft.

5. The collapsible handcart as defined in claim 1, further comprising a driven device which can be driven by said trigger device for displacement between a first position and a second position and the direction of movement of said driven device is substantially perpendicular to the direction of movement of said trigger device.

6. The collapsible handcart as defined in claim 5, wherein said driven device has a first hole and a second hole in communication with each other and arranged along the direction of movement of said driven device and said driven device further has at least a converting portion at a boundary of said first hole and said second hole, whereby said shaft will be driven to turn a predetermined angle and enter said first hole when said driven device moves to the second position.

7. The collapsible handcart as defined in claim 6, wherein said shaft has at least a flat surface and said driven device has at least a flat surface at a side wall of said second hole adapted to be engaged with said flat surface of the shaft.

8. The collapsible handcart as defined in claim 5, further comprising biasing means adapted for driving said driven device to move from the first position to the second position.

9. The collapsible handcart as defined in claim 1, further comprising a housing fixed on said wheel seat, said housing has a guiding rail for said trigger device to slidably engage therewith and an opening corresponding to said opening of said first tube.

10. The collapsible handcart as defined in claim 9, wherein said housing has an extended board at a side thereof attached on said first tube.

11. The collapsible handcart as defined in claim 9, wherein said housing has a bearing arm resting against said first tube.

12. The collapsible handcart as defined in claim 1, wherein said shaft of said platform is fixedly fastened with a driven device and said driven device and said trigger device are provided with a driven portion and a pin therebetween such that said pin rests against said driven portion so that the displacement of said trigger device will drive said driven device to rotate.

13. The collapsible handcart as defined in claim 1, wherein said trigger device has a rack thereon and said shaft is fixedly fastened with a gear meshed with said rack such that the displacement of said trigger device will drive said driven device to rotate.

14. The collapsible handcart as defined in claim 1, wherein said trigger device is fixedly fastened to said shaft and said second tube drives said trigger device to turn.

* * * * *